(12) United States Patent
Bastioli et al.

(10) Patent No.: US 8,043,679 B2
(45) Date of Patent: Oct. 25, 2011

(54) BIODEGRADABLE COMPOSITIONS BASED ON NANOPARTICULATE STARCH

(75) Inventors: Catia Bastioli, Novara (IT); Giovanni Floridi, Novara (IT); Gianfranco Del Tredici, Sesto Calende (IT)

(73) Assignee: Novamont S.p.A., Novara (IT)

( * ) Notice: Subject to any disclaimer, the term of this patent is extended or adjusted under 35 U.S.C. 154(b) by 377 days.

(21) Appl. No.: 12/441,868

(22) PCT Filed: Sep. 26, 2007

(86) PCT No.: PCT/EP2007/060230
§ 371 (c)(1),
(2), (4) Date: Mar. 18, 2009

(87) PCT Pub. No.: WO2008/037749
PCT Pub. Date: Apr. 3, 2008

(65) Prior Publication Data
US 2009/0311455 A1    Dec. 17, 2009

(30) Foreign Application Priority Data
Sep. 27, 2006    (IT) .............................. MI2006A1844

(51) Int. Cl.
*B28B 23/00* (2006.01)
*B29D 22/00* (2006.01)
*B29D 23/00* (2006.01)
*B32B 1/08* (2006.01)

(52) U.S. Cl. ...................... 428/36.4; 428/35.7; 428/35.2; 428/220; 428/323; 428/327; 428/338; 428/339; 428/480; 428/532; 220/DIG. 30; 383/1; 206/524.6; 206/524.7; 523/128

(58) Field of Classification Search ................. 428/35.7, 428/36.4, 35.2, 220, 323, 327, 338, 339, 428/480, 532; 523/128; 220/DIG. 30; 383/1; 206/524.6, 524.7
See application file for complete search history.

(56) References Cited

FOREIGN PATENT DOCUMENTS
WO    WO-9820073    5/1998
WO    WO-2006097353    9/2006

*Primary Examiner* — Michael C Miggins
(74) *Attorney, Agent, or Firm* — Connolly Bove Lodge & Hutz LLP

(57) ABSTRACT

The present invention relates to biodegradable multiphase compositions comprising a continuous phase composed of a matrix of at least one tough hydrophobic polymer incompatible with the starch and a nanoparticulate dispersed starch phase with mean dimensions of less than 0.25 m. The compositions are characterized by breaking load, Young's Modulus and breaking energy.

48 Claims, 1 Drawing Sheet

BIODEGRADABLE COMPOSITIONS BASED ON NANOPARTICULATE STARCH

CROSS REFERENCE TO RELATED APPLICATIONS

This application is a National Stage of PCT/EP2007/060230 filed Sep. 26, 2007 0which in turn claims priority from Italian Application MI2006A001844 filed Sep. 27, 2006, the entire contents of which are incorporated herein by reference.

The present invention relates to biodegradable multiphase compositions based on starch, capable of being transformed into flexible films with longitudinal tensile properties in traction at 23° C., 50% RH that give rise to a K factor greater than 28, preferably greater than 30 and even more preferably greater than 33, defined as follows:

$$K=(\text{Breaking load})\times(\text{Young's Modulus})\times(\text{Breaking energy})/1{,}000{,}000$$

with Breaking load and Young's modulus expressed in MPa and Breaking energy in KJ/m². These films have no phenomena of transverse tearing even at relative humidity of less than 20% and at 23° C. and are particularly suitable for producing very tough bags and wrappings. These properties are even more noteworthy as they refer to films obtained without post-film stretching.

The compositions according to the present invention are water insoluble and not water dispersible according to the standard UNI 10956 or EN 14987.

In particular, the present invention relates to multiphase biodegradable compositions comprising at least two phases:
(a) a continuous phase composed of a matrix of at least one tough hydrophobic polymer incompatible with starch, said polymer being selected from the class of polyesters from diacid-diol;
(b) a homogeneously dispersed nanoparticulate starch phase with mean dimensions of less than 0.25 μm, preferably less than 0.20 μm, and even more preferably less than 0.18 μm; wherein the K factor is greater than 28, preferably greater than 30 and even more preferably greater than 33.

The dimensions of starch particles are measured in the transverse section with respect to the direction of the extrusion flow or, anyhow, with respect to the direction of material's output. The dimension of a starch particle is therefore measured on the bidimensional shape resulting from the transverse section.

The mean dimension of the starch particles is calculated as the numeral (or arithmetic) average of the particles dimensions.

In case of a spherical particle the dimension of the particle corresponds to the diameter of a circle.

In case of a non-spherical particle the dimension (d) of the particle is calculated according to the following formula:

$$d=\sqrt{d_1 \cdot d_2}$$

where $d_1$ is the minor diameter and $d_2$ is the major diameter of the ellipse in which the particle can be inscribed or approximated.

Preferably, the compositions according to the present invention have a distribution of the starch particles such as:
dimension of 80% of the starch particles is less than 0.35 μm;
the area of such 80% starch particles is greater than 45% with respect to the total area of the starch particles.

Particularly preferred according to the present invention are compositions with a distribution of the starch particles such as:
dimension of 80% of the starch particles is less than 0.25 μm;
the area of such 80% starch particles is greater than 50% with respect to the total area of the starch particles.

One drawback of the starch-based biodegradable bags currently present on the market is represented by the lack of uniformity of the mechanical properties, in particular tear strength, in the transverse and longitudinal directions. Shopping bags measuring 60×60 cm used by large-scale retailers are prevalently made of PE with thicknesses of around 18-20 μm, while at these thicknesses, starch-based biodegradable films are still too yielding or too fragile to withstand certain limits of weight (i.e. 10 kg). These limits in performance are particularly apparent in conditions of low humidity.

The aforesaid technical problem has now been solved with the biodegradable compositions based on starch, according to the present invention which, having a high load, a modulus superior to that of a normal LDPE and extremely high tenacity in the two directions, without any transverse displacement, are particularly advantageous for producing thin films.

In fact, the present biodegradable compositions allow bags with thicknesses in the order of 18-20 μm and even with thicknesses lower than 18 μm if needed from a practical application, to be produced, in other words, with thicknesses comparable to bags made of the medium density polyethylene. It is also possible to produce "loop-handle" bags with dimensions of approximately 70×70 cm and thicknesses in the order of 50 μm, the same thickness as LDPE loop-handle bags.

BRIEF DESCRIPTION OF DRAWINGS

FIG. 3 is a microphotograph of the composition of Example 3.

BEST AND VARIOUS MODE FOR CARRYING OUT INVENTION

Figure 1:
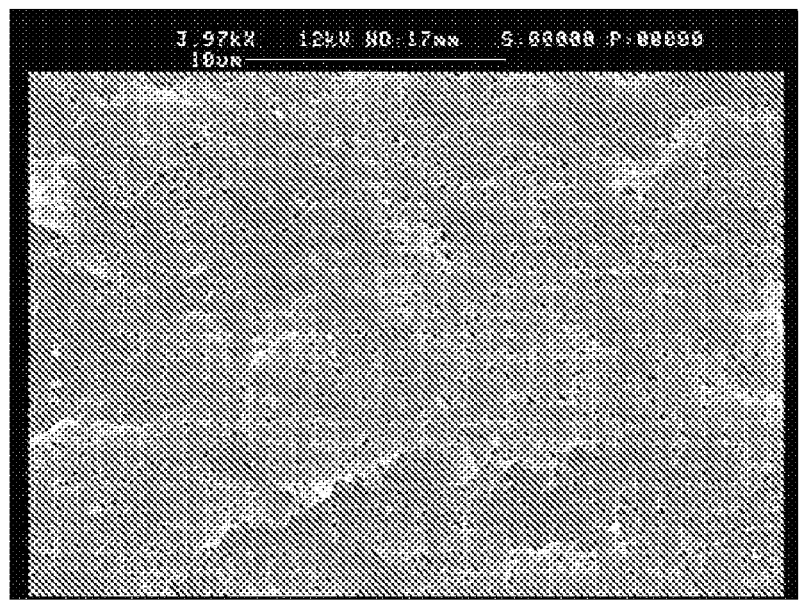
FIG. 1 is a microphotograph of the composition of Example 1.

The present compositions are biodegradable according to the standard EN 13432.

In particular, the materials according to the present invention comprise:
(a) with regard to the hydrophobic matrix, at least one tough thermoplastic polymer incompatible with the starch and in the continuous phase between 55 and 95%, preferably between 58 and 90%, more preferably between 60 and 85%, and even more preferably between 62 and 80%;
(b) with regard to the dispersed starch phase, at least one destructurized nanoparticulate starch in a percentage between 5 and 45%, preferably between 10 and 42%, more preferably between 15 and 40% and even more preferably between 20 and 38%.

To obtain a material with breaking load, and tenacity in the two transverse and longitudinal directions, superior to the materials described in prior art it is necessary to use specific weight ratios of the various components, and to use a process in the extruder or any other machine capable of providing temperature and shear conditions that allow reduction of the dispersed phases in very small particles.

In general, the most suitable extrusion systems are those that use laminating screws with a ratio between the maximum and minimum diameter of the screw of less than 1.6 and more preferably less than 1.4.

With regard to the hydrophobic matrix, tough polyesters from diacid-diol are taken into consideration herein, i.e. polyesters characterized by Modulus of less than 200 MPa and ultimate elongation greater than 500%, such as the aliphatic aromatic polyesters from diacid/diol of the type described in EP 559 785 (Eastman), EP 792 309 (BASF) and WO 2006/097353 (Novamont). Within the limits indicated, aliphatic polyesters from diacid/diol of the type described in EP 1 117 738 are also taken into consideration here.

Particularly preferred are polyesters in which the diacid moiety is chosen from at least one of the following diacids: succinic, adipic, azelaic, sebacic, undecandioic, dodecandioic, brassylic acid or mixtures thereof.

Even more preferred are polyesters from diacid-diol in which the diacid moiety, in addition to the diacids mentioned above, contains also aromatic diacids.

Said aromatic acids are chosen from the group consisting of dicarboxylic compounds of the phtalic-acid type and their esters, preferably terephthalic acid. Said aromatic acids are present in an amount 49 to 66 mol %, preferably 49.5 to 63 mol %, still more preferably 50 to 61 mol % with respect to the total amount of the acid components.

During the polymer synthesis process various additives such as polycarbodiimides, polyepoxy resins, peroxides and oxazolines can also be added. Particularly polyepoxy resins can be advantageously added as additives in order to stabilize the final multiphase composition against hydrolysis. Particularly preferred are resins of the glycidyl type. Still more preferred is BADGE (bisphenol A diglycidyl ether).

With regard to the starch phase, all native starches are included here, such as those from potato, corn, tapioca, pea, rice, wheat and also high-amylose starch—preferably containing more than 30% by weight of amylose—and waxy starches. Compositions containing destructurized starch are preferred.

Starches such as corn and potato starch, capable of being easily destructurizable and which have high initial molecular weights, have proven to be particularly advantageous.

The use of corn and potato starch is particularly preferred.

For destructurized starch, the teachings contained in EP-0 118 240 and EP-0 327 505 are referred to here, this being intended as starch processed so that it substantially has no "Maltese crosses" under the optical microscope in polarized light and no "ghosts" under the optical microscope in phase contrast.

Furthermore, physically and chemically modified starch grades can be in part used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches.

The compositions according to the present invention show good properties also in case of starch blends in which the starch is not strongly complexed. With regard to the complexation of the starch, the teachings contained in EP-0 965 615 A1 have to be intended as incorporated in the present description. The presence of the complexes of starch with one tough hydrophobic polymer incompatible with the starch can be demonstrated by the presence in the X-ray diffraction spectra of a peak in the range of the 13-14° on the 2 theta scale. According to the present invention, with the wording compositions in which the starch is not strongly complexed are intended the compositions where the Hc/Ha ratio between the height of the peak (Hc) in the range of 13-14° of the complex and the height of the peak (Ha) of the amorphous starch which appears at about 20.5° is less than 0.15 and even less than 0.07.

The compositions according to the invention can contain further dispersed phases composed, for example, of rigid polymers, in particular polyhydroxyalkanoates, such as polylactic acid and polyglycolic acid. Particularly preferred are polymers or copolymers of polylactic acid containing at least 75% of L-lactic or D-lactic acid or combinations thereof, with molecular weight $M_w$ greater than 70,000 and with a modulus greater than 1,500 MPa. These polymers can also be plasticized.

In the formation phase of the multiphase structure of the present biodegradable compositions there must be at least one plasticizer for the starch to provide suitable rheological properties to minimize the dimensions of the starch phase. This plasticizer can simply be water (even the water contained in the native starch alone without the need for further additions), or self-boiling or polymer plasticizers. The quantity of plasticizer is generally chosen on the basis of rheological needs and of the mixing system.

In any case, plasticizers can be added in a quantity of less than 10% in relation to the components (A+B). Besides water, plasticizers that can be utilized in the compositions according to the invention are, for example, those described in WO 92/14782, with glycerol as the particularly preferred plasticizer.

Compositions containing water as the only plasticizer are preferred. Compositions containing the water present in native starch as the only plasticizer are particularly preferred In the present biodegradable compositions various additives can also be incorporated, such as antioxidants, UV stabilizers, heat and hydrolysis stabilizers, chain extenders, flame retardants, slow release agents, inorganic and organic fillers, such as natural fibres, antistatic agents, wetting agents, colorants, lubricants or compatibilizing agents among the various phases. Examples of hydrolysis stabilizers are polycarbodiimides and epoxy resins.

Among polycarbodiimides particularly preferred are aliphatic polycarbodiimides.

Among epoxy resins particularly preferred are epoxidized polymethacrylates, in particular of the glycidyl type. The most preferred is a poly epoxy propyl methacrylate.

Example of chain extenders are peroxides. Among peroxides particularly preferred are organic peroxides.

Thanks to the nanoparticulate dispersed starch phase, the biodegradable multiphase compositions according to the invention are particularly suitable for being transformed into flexible films with high modulus and at the same time provided with isotropy in the two longitudinal and transverse directions, in particular in relation to tear strength. Said films are particularly suitable for producing bags and wrappings capable of supporting heavy weights without severe deformations and without the occurrence of transverse fractures.

The films obtained from the biodegradable multiphase composition according to the invention can also be used to make sacks and bags for carrying goods, film and bags for food packaging, stretchable, heat-shrinkable film, film for adhesive tape, for disposable nappy tapes and for decorative coloured tapes. Some other main applications are for silage, for breathable bags for fruit and vegetables, bags for bread and other food products, film for covering packs of meats, cheese and other food items and yoghurt pots.

Due to their properties, the biodegradable multiphase compositions according to the invention can also find application in the field of textiles and non-woven fabric for clothing, co-extruded fibers and spun-bonded, hygiene and industrial products, and also for fishing nets or nets fruit and vegetables.

The present invention is now illustrated with reference to some non-limiting examples thereof.

The present invention is now illustrated with reference to some non-limiting examples thereof.

EXAMPLES

TABLE 1

| Example | POTATO STARCH | ECOFLEX | H2O | LUBRICANT |
|---|---|---|---|---|
| 1 | 32 | 74 | 0 | 0.3 |
| 2 | 32 | 74 | 3 | 0.3 |

The compositions are expressed in parts. Ecoflex® is a polybutylene adipate-co -terephthalate produced by BASF AG.

The compositions indicated in Table 1 were fed to a co-rotating extruder with L/D=36 and diameter 60 mm with 9 heating zones.

The extrusion parameters are as follows:
RPM: 140
Flow rate: 40 kg/hour
Thermal profile 60-140-175-180×4-155×2° C.
Screw diameter ratio (max. diam./min. diam.) 1.31-1.35
Ratio between transport and mixing zones: 2:1
Degassing in zone 8 out of 10
Final water content of the granule equal to 0.8%

The compositions of Table 1 were filmed on a 40 mm Ghioldi machine, die gap=1 mm, flow rate 20 kg/h to obtain film with a thickness of 20 μm.

The 20 μm films were then subjected to mechanical characterization according to the standard ASTM D882 (traction at 23° C. and 55%; Relative humidity and Vo=50 mm/min).

The results are indicated in Table 2 below.

TABLE 2

| Ex. | σy (MPa) | εy (%) | σb (MPa) | εb (%) | E (MPa) | Enb (KJ/m²) | K Factor |
|---|---|---|---|---|---|---|---|
| 1 | 9 | 8 | 38 | 397 | 226 | 5370 | 46.1 |
| 2 | 9 | 8 | 37.5 | 347 | 225 | 5274 | 44.5 |

The granules of the compositions according to examples 1 and 2 were fractured, subjected to acid etching to eliminate the starch particles, then a microphotography was performed with ×4000 magnification under the Scanning Electron Microscope (SEM).

Figure 2:
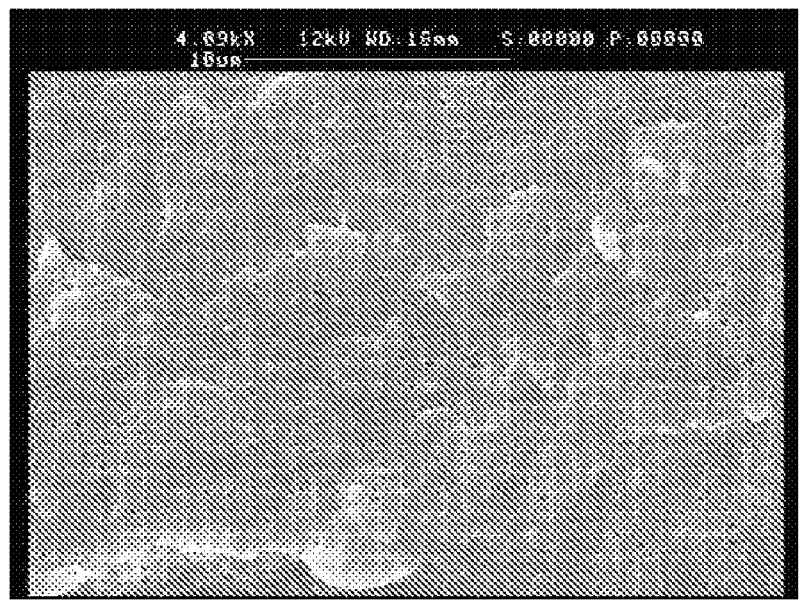
FIG. 2 is a microphotograph of the composition of Example 2.

The microphotographs relating to Example 1 and 2 are shown in FIGS. 1 and 2, respectively.

They show:
a dimension of the starch nanoparticles with a numeric mean of less than 0.25 μm;
a distribution of the starch nanoparticles such as:
dimension of 80% of them is less than 0.2 μm;
the area of such 80% is greater than 45% with respect to the total area of the starch particles.

Example 3

Comparison

The example n° 5 of the patent EP 0 965 615 A1 was repeated.

The composition obtained according to said example was filmed with a thickness of 20 μm.

The table below (Table 3) shows the mechanical properties of the resulting film.

TABLE 3

| Ex. | σb (MPa) | E (MPa) | Enb (KJ/M2) | K factor |
|---|---|---|---|---|
| 3 | 22 | 160 | 4423 | 15.6 |

The film of the composition according to example 3 was fractured, subjected to acid etching to eliminate the starch particles and microphotography was performed with ×4000 magnification under the Scanning Electron Microscope (SEM).

The microphotographs relating to Example 3 is shown in FIG. 3.

The microphotograph shows:
a dimension of the starch nanoparticles with a numeric mean of 0.43 μm;
a distribution of the starch nanoparticles such as:
dimension of 80% of them is less than or equal to 0.56 μm;
the area of such 80% is 44% with respect to the total area of the starch particles.

Only 50% of the starch particles has dimension less than or equal to 0.35 μm and it covers an area of only 13% with respect to the total area of the starch particles.

The invention claimed is:

1. Multiphase biodegradable compositions comprising at least two phases:
   (a) a continuous phase composed of a matrix of at least one tough hydrophobic polymer incompatible with starch, said polymer being selected from the class of polyesters from diacid-diol;
   (b) a homogeneously dispersed nanoparticulate starch phase;
   wherein a flint of a thickness of 20 μm obtained from said compositions and tested according to ASTM D822 is characterized by a K factor greater than 28 and by numeric mean dimentions of the particles of said dispersed starch phase (b) of less than 0.25 μm, wherein the K factor is defined by the following formula $$K = (\text{Breaking load}) \times (\text{Young's Modulus}) \times (\text{Breaking energy})/1{,}000{,}000$$

With Breaking load and Young's Modulus expressed in MPa and Breaking energy in KJ/m².

2. Multiphase biodegradable compositions according to claim 1, characterized by K factor greater than 30.

3. Multiphase biodegradable compositions according to claim 1, characterized by K factor greater than 33.

4. Multiphase biodegradable compositions according to claim 1, characterized by a dispersed starch phase with in particles having mean dimensions of less than 0.20 μm.

5. Multiphase biodegradable compositions according to claim 1, characterized by a dispersed starch phase with in. particles having mean dimensions of less than. 0.18 μm.

6. Multiphase biodegradable compositions according to claim 1, characterized by a distribution of the starch nanoparticles is as follows:
dimension of 80% of the starch particles is less than 0.35 μm;
the area of such 80% starch particles is greater than 45% with respect to the total area of the starch particles.

7. Multiphase biodegradable compositions according to claim 1, characterized in that (a) said matrix comprises at least one tough thermoplastic polymer incompatible with starch in the continuous phase in an amount from 55 to 95%;
(b) said dispersed starch phase comprises at least one destructurized nanoparticulate starch in an amount from 5 to 45%.

8. Multiphase biodegradable compositions according to claim 1, characterized in that:
(a) said matrix comprises at least one tough thermoplastic polymer incompatible with starch in the continuous phase in an amount from 58 to 90%;
(b) said dispersed starch phase comprises at least one destructurized nanoparticulate starch in an amount from 10 to 42%.

9. Multiphase biodegradable compositions according to claim 1, characterized in that:
(a) said matrix comprises at least one tough thermoplastic polymer incompatible with starch in the continuous phase in an amount from 60 to 85%;
(b) said dispersed starch phase comprises at least one destructurized nanoparticulate starch in an amount from 15 to 40%.

10. Multiphase biodegradable compositions according to claim 1, characterized in that:
(a) said matrix comprises at least one tough thermoplastic polymer incompatible with starch in The continuous phase in an amount from 62 to 80%;
(b) said dispersed starch phase comprises at least one destructurized nanoparticulate starch in an amount from 20 to 38%.

11. Multiphase biodegradable compositions according to claim 1, wherein said tough thermoplastic polymer is characterized by Modulus of less than 200 MPa.

12. Multiphase biodegradable compositions according to claim 1, characterized by an ultimate elongation greater than 500%.

13. Multiphase biodegradable compositions according to claim 1, characterized in that said polyester comprises a diacid moiety derived from a diacid selected from the group consisting of the following aliphatic diacids: succinic, adipic, azelaic, sebacic, undecandioic, dodecandioic, brassylic acid or mixtures thereof.

14. Multiphase biodegradable compositions according to claim 1, characterized in that in the formation phase of the multiphase structure, at least one plasticizer for the starch is present.

15. Multiphase biodegradable compositions according to claim 1, obtained by processing the components thereof in an extruder or other machine capable of providing temperature and shear conditions that allow a reduction of the dimensions of the particles of said dispersed starch phase (b) to less than 0.25 μm.

16. Multiphase biodegradable compositions according to claim 1, characterized in that said polyester comprises a diacid moiety derived from at least one aromatic diacid.

17. Multiphase biodegradable compositions according to claim 16, characterized in that said diacid moiety is selected from the group consisting of dicarboxylic compounds of the phtalic-acid type and their esters.

18. Multiphase biodegradable compositions as claimed in claim 17, characterized in that said dicarboxylic compound of the phtalic-acid type is a compound of terephthalic acid.

19. Multiphase biodegradable compositions according to claim 18, characterized in that said terephthalic acid is present in an amount from 49 to 66 mol % with respect to the total amount of the acid components.

20. Multiphase biodegradable compositions according to claim 18, characterized in. that said terephilmlic acid is present in an amount from 49.5 to 63 mol % with respect to the total amount of the acid components.

21. Multiphase biodegradable compositions according to claim 18, characterized in that said terephthalic acid is present in an amount from 50 to 61 mol % with respect to the total amount of the acid components.

22. Multiphase biodegradable compositions according to claim 1, characterized in that said matrix of at least one tough hydrophobic polymer comprises additives selected from polycarbodiimides, polyepoxy resins, peroxides or oxazolines.

23. Multiphase biodegradable compositions as claimed in claim 22, wherein said additives are polyepoxy resins.

24. Multiphase biodegradable compositions as claimed in claim 23, wherein polyepoxy resins are bisphenol A diglycidyl ether.

25. Multiphase biodegradable compositions according to claim 1, characterized in that said dispersed starch phase (b) is made of native starch.

26. Multiphase biodegradable compositions as claimed in claim 25 wherein native starch is selected from the group consisting of potato, corn, tapioca, pea, rice, wheat, high-amylose starch—preferably containing more than 30% by weight of amylase—and waxy starch.

27. Multiphase biodegradable compositions as claimed in claim 26, wherein native starch is destructurized native starch.

28. Multiphase biodegradable compositions as claimed in claim 27, wherein the destructurized native starch is potato and corn starch.

29. Multiphase biodegradable compositions as claimed in claim 28, wherein the destructurized native starch is potato starch.

30. Multiphase biodegradable compositions according to claim 1, characterized in that said dispersed starch phase
(b) comprises physically and chemically modified starches.

31. Multiphase biodegradable compositions according to claim 30, characterized in that said physically and chemically modified starches are selected from the group consisting of: ethoxylated starches, oxypropylated starches, starch acetates, starch butyrate, starch propionates, with a substitution degree comprised within the range of from 0.1 to 2, cationic starches, oxidized starches, cross-linked starches, gelled starches.

32. Multiphase biodegradable compositions according to claim 1, characterized in that said further dispersed phase comprises a polyhydroxyalkanoate.

33. Multiphase biodegradable compositions as claimed in claim 32, wherein said polyhydroxyalkanoate is, a polymer or copolymer of polylactic acid with molecular weight $M_w$ greater than 70,000 and with a modulus greater than 1,500 MPa.

34. Multiphase biodegradable compositions according to claim 1, characterized by containing plasticizers in quantities of less than 10% in relation to the sum of (a)+(b).

35. Multiphase biodegradable compositions as claimed in claim 34, wherein the plasticizer is water or glycerol, or mixtures of both.

36. Multiphase biodegradable compositions as claimed in claim 35, wherein the plasticizer is the water contained in the native starch.

37. Multiphase biodegradable compositions according to claim 1, characterized in. that said in the formation phase of said compositions, additives other than plasticizers are added.

38. Multiphase biodegradable compositions as claimed in claim 37 wherein said additives are selected from antioxidants, UV stabilizers, heat and hydrolysis stabilizers, chain extenders, flame retardants, slow release agents, inorganic and organic fillers, such as natural fibres, antistatic agents, wetting agents, colorants, lubricants or compatibilizing agents between the various phases.

39. Multiphase biodegradeable compositons as claimed in claim 38 wherein hydrolysis stabilizers are carbodiimides and epoxy resins.

40. Multiphase biodegradable compositions as claimed in claim 39 wherein carbodiimides are aliphatic carbodiimides.

41. Multiphase biodegradable compositions as claimed in claim 39 wherein epoxy resins are epoxidized polymethacrylates.

42. Multiphase biodegradable compositions as claimed in claim 41 wherein epoxidized polymethacrylates are of the glycidyl type.

43. Multiphase biodegradable compositions as claimed in claim 42 wherein epoxidized polymethacrylate of the glycidyl type is a poly epoxy propyl methacrylate.

44. Film produced with multiphase biodegradable compositions according to claim 1.

45. Bags or sacks, extruded or thermoformed, laminated with paper, aluminum, plastic and bioplastics, multiperforated produced with film as claimed in claim 44.

46. Use of bags according to the claim 45 for carrying goods, for food packaging, as breathable bags for fruit and vegetables, bags for bread and other food products.

47. Film according to claim 44 for food packaging, stretchable, heat-shrinkable film, film for adhesive tape, for disposable nappy tapes and for decorative coloured tapes, film for covering packs of meats, cheese and other food items and yoghurt pots, film for silage.

48. Textiles and non-woven fabric for clothing, coextruded fibers and spun bonded, hygiene and industrial products, including fishing nets or nets for fruit and vegetables produced with the substantially water insoluble biodegradable multiphase compositions as claimed in claim 1.

* * * * *